March 7, 1967 R. M. JAMISON ETAL 3,307,334
GAS WASHERS HAVING IMPROVED GAS FLOW CHARACTERISTICS
Filed June 10, 1964 2 Sheets-Sheet 1

INVENTORS
ROBERT M. JAMISON
NICHOLAS J. PANZICA
ORLAN M. ARNOLD
BY EMIL UMBRICHT

ATTORNEYS

March 7, 1967  R. M. JAMISON ETAL  3,307,334
GAS WASHERS HAVING IMPROVED GAS FLOW CHARACTERISTICS
Filed June 10, 1964  2 Sheets-Sheet 2

INVENTORS
ROBERT M. JAMISON
NICHOLAS J. PANZICA
ORLAN M. ARNOLD
EMIL UMBRICHT

BY

ATTORNEYS

United States Patent Office 3,307,334
Patented Mar. 7, 1967

3,307,334
GAS WASHERS HAVING IMPROVED GAS FLOW CHARACTERISTICS
Robert M. Jamison and Nicholas J. Panzica, Detroit, Orlan M. Arnold, Grosse Pointe Park, and Emil Umbricht, Northville, Mich., assignors to Ajem Laboratories, Inc., Livonia, Mich.
Filed June 10, 1964, Ser. No. 374,073
10 Claims. (Cl. 55—229)

This invention relates to gas washing devices and the like, and more particularly to gas washers incorporating a number of improvements to increase their washing efficiency.

Gas washers of various types have been used for some time to remove pollutants, in the form of both suspended solids and chemical fumes, from gases, particularly from gases released to the atmosphere from industrial operations. The public interest in atmospheric pollution control, however, is steadily increasing along with the industrial growth of the nation and the attendant increase in pollution sources, and as the problems of public nuisance and the dangers to public health created thereby are being recognized. That interest is manifested in the increasing number of requirements, by governmental authorities at all levels, proposed and promulgated for the alleviation of air pollution problems. Cities and towns are "clamping down" on their industries in serious efforts to get business organizations to stop releasing contaminated gases into the atmosphere. New laws and ordinances being enacted are more stringent, for example in smaller maximum allowable contaminant concentrations.

To meet the above-mentioned demands, industrial organizations, e.g., chemical manufacturers, refiners and foundries, need better devices for disposing of polluted, contaminated gases exhausted from their operations. Although washers currently available have been effective for the most part, the requirements to remove greater and greater proportions of pollutants, and especially fine particles, often imposes conditions beyond the capabilities of such washers. Furthermore, the additional expense of both initial cost and operation brought on by using larger numbers of washers increases the need for higher efficiencies and simplified design and construction.

Accordingly, it is an object of this invention to provide improved gas washers. It is more particularly an object to provide more efficient washers. It is also an object to increase the effectiveness of gas washers. Yet another object is the provision of washers better adapted for meeting the increased demands of air pollution control. Other objects of the invention will be in part obvious and in part discussed hereinbelow.

Gas washers within the purview of this invention are of the type wherein a liquid washing medium is generated into an intense spray of high velocity droplets and the gas to be washed is passed through the spray. For example, a fan or blower, or the like, is used to flow contaminated gas through a housing. Within the housing is a device for generating an intense spray of washing liquid and driving its droplets at high velocity through the gas flow.

The respective directions of flow of the spray and the gas are desirably perpendicular to one another, that is, either flow can be thought of as traversing the other. The droplets in the spray contact the pollutant particles, whether liquids, solids or gaseous, and absorb, chemically react with or otherwise remove them and carry them off from the flowing gas. The contaminant-containing droplets are eliminated from the gas flow and, if desired, returned to a place of accumulation, e.g., a reservoir, where they can be relieved of their burden and used again.

Associated with this type of gas washer are a number of rather technical and bothersome problems which relate to the effectiveness, design and efficiency of the washers. For example, the zone of washing-liquid spray should be uniform so as to avoid spaces or "shadows" through which gas can flow untouched by spray droplets. The droplets of the spray must travel at high speeds in order to effectively "sweep out" contaminants. Speed is also important to overcome a tendency for fine pollutant particles to be pushed away from liquid droplets by a buffer of gas that tends to be pushed in front of such particles and droplets. The distribution of gas when entering the spray zone should be as uniform as possible, as otherwise, in some regions of the zone, the droplets will be wasted in the sense that too little polluted gas passes them while in other areas the quantity of spray droplets is insufficient to remove an inordinate amount of contaminants in an excessive quantity of gas. In the latter situation there is also a tendency for "blow holes" to occur, that is, for the gas to rush through parts of the spray in such quantities that the spray droplets are carried along with it leaving gaps or holes in the spray pattern.

Prompt and effective removal of contaminant-containing droplets is important also, since if they are allowed to be discharged from the washer with the washed gas, the liquid will subsequently vaporize and restore the entrapped pollutants to the gases.

The bulk of the droplets in the spray traverse the gas flow and impinge on the washer housing where they aggregate and flow downwardly e.g., to a reservoir in the washer base. Other droplets may be caught in the flow of gas because of, for example, insufficient kinetic energy to cross the flow or after spattering or ricochetting from the housing. Such droplets are customarily removed from the gas flow by passing the gas through a tortuous path formed by a number of baffles called "eliminators." Liquid droplets are not as able to negotiate the tortuous path as the gas, and impinge and deposit on the eliminators. However, nonuniform distribution of gas may result in inordinate amounts of droplets going to the eliminators, and a portion of the droplets may pass through the overburdened eliminators and be exhausted to the atmosphere.

With these factors in mind it will be apparent that generation of a uniform, high velocity spray and uniform distribution of the gas within the washer are important to the effectiveness and efficiency of the gas washers.

The invention can be better understood by reference to the accompanying drawings wherein FIGURE 1 is an axial section and shows a gas washer of the type under consideration;

Figure 1:
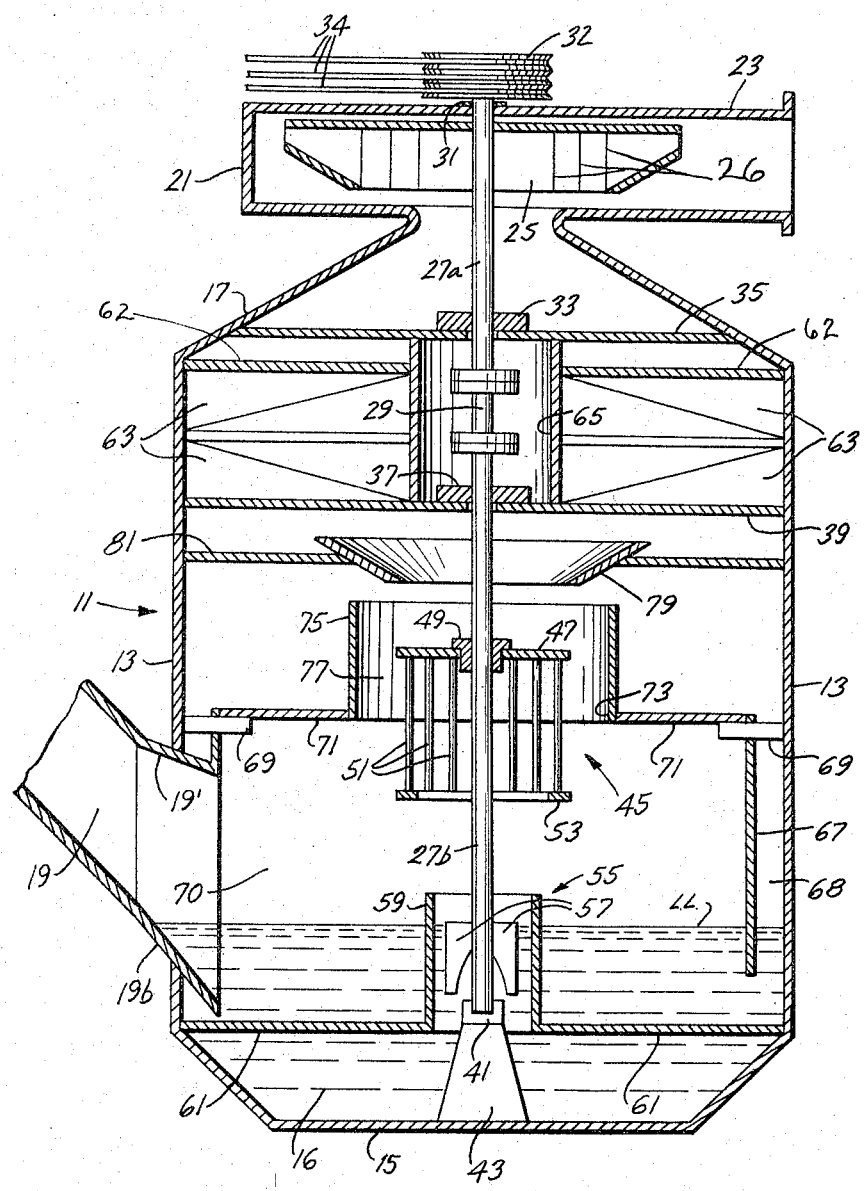

Referring to FIGURE 1, the washer 11 shown therein comprises a housing 13 having a base 15 forming a reservoir 16 and a tapered upper end 17. At one side of the housing is a gas inlet 19 and at the top is a blower housing 21 and a gas exhaust duct 23. A blower 25 for drawing gas through the washer is located in the blower housing 21. Located axially of the washer 11 is an operating shaft 27 composed of an upper section 27a and a lower section 27b connected by a flexible coupling device 29. The upper shaft section 27a is journaled in bearings 31 at the top of the blower housing 21 and in bearings 33 supported by frame members 35 extending from the housing. Above the bearing 31, secured to the upper end of the shaft 27a, is a sheave 32 driven by belts 34 from a motor (not shown). The blower 25, comprising a number of radial impeller elements 26, is driven by the shaft 27a. The upper end of the lower shaft section 27b is journaled in bearings 37 supported by frame members 39 and at its lower end by bearings 41 supported by a pillar 43 rising from the base 15.

About intermediate the ends of the lower shaft 27b is a spray generator 45 for converting a feed of washing liquid into an intense, high-speed spray. The generator 45 comprises an upper disk 47 welded or otherwise secured to the shaft 27b along with a reinforcing collar 49. Extending downwardly from the disk 47, and secured thereto near its periphery, are a plurality of bars 51 which strike the washing liquid fed to the generator and spatter it into droplets and impart great speed to the droplets. The lower ends of the bars 51 are held by an annular ring 53.

Toward the lower end of the shaft 27b is pump means 55 comprising impeller blades 57 secured to the shaft and a collar 59 surrounding and spaced from the blades. The collar is supported by frame members 61 extending from the housing 13. The upper ends of the blades are desirably at or below the liquid level LL. in the reservoir 16 so that, when the shaft 27 rotates, the blades throw liquid upwardly. The liquid is guided by the collar 59 and fed into the generator 45 through the ring 53. It will be appreciated that other means can be used to feed liquid to the generator, e.g., a pump independent of the shaft 27 with conduit means to the generator and an intake in the reservoir.

Above the spray generator 45 and spaced between the frame members 62 and 39 are a number of baffles or spray eliminators 63 spanning between the housing and the support members 65. The eliminators 63 are, preferably, V-shaped sheets of stiff material such as metal or plastic disposed along radii from the housing axis. Several tiers of such eliminators, desirably with the baffles in offset vertical relation, provide a tortuous path for the gas flowing thereby.

The operation of the washer 11 is as follows: The drive means rotate the shaft 27 and the blower 25, the generator 45 and the pump 55 all attached thereto. The blower 25 draws contaminated gas through the washer, and the pump 55 throws liquid into the generator 45 where it is spattered and thrown violently outward as an intense spray of droplets. Contaminants in the gas passing through the spray zone are contacted and carried off by the droplets and the gas is thereby washed. Liquid droplets deposit on the housing walls, the eliminators 63 and other parts to be described, and drain back to the reservoir 16. The washed gas passes through the blower 25 and is exhausted from the washer through the duct 23.

Within the housing 13 are a number of different types of baffles which serve to improve the flow and distribution of the gas through the washer, particularly through the spray zone, as well as to improve the removal of entrained and deposited liquid droplets.

An annular inner shell 67 is spaced from the housing and suitably supported therefrom, for example by arms 69. The inlet duct 19 extends through the inner shell 67 so that incoming gas enters the interior space 70 defined by the shell. The inner shell 67 extends downwardly below the level of the liquid LL. in the reservoir to provide a liquid seal which prevents gas from flowing under the shell and up through the annular space 68 between the shell and housing. That space 68, however, as will be explained later, provides a passage for the liquid from the spray zone to return to the reservoir. The space 70 bounded by the inner shell 67 is a relatively large volume in which the incoming gas can be distributed.

As previously mentioned, the initial distribution of the gas is important. Since the velocity of the gas through the washer is of the order of several thousand feet per minute and the direction of its flow is changed after entry, the large space 70 allows a substantial reduction of velocity and thus an opportunity for the gas to be distributed.

An annular disk 71, which may be flat or frusto-conical in shape, is supported on the top of the inner shell 67. The opening 73 in the disk 71 provides a passageway for the gas upwardly through the washer, and particularly through the spray zone. Thus, gas distributed in the space 70 must pass through the constriction of the opening 73 in the very heart of the spray zone. The liquid droplets in that region are at very high velocity and are very concentrated, that is, there are a great number of droplets per unit volume per unit time, because they have not travelled far enough to lose their energy or to "spread" out. In other words, in that region, the number of droplets passing through a given volume in a given period of time is much greater than the number in a corresponding volume farther removed from the generator 45, and the particles move at their greatest velocity close-in near the generator. The efficiency of contacting and removing pollutants from the gas is substantially increased by channelling the gas flow close to the generator.

In order to assure advantage of the closeness of the gas flow, an upright annular baffle 75 forming a channel 77 is placed at the opening 73 of the disk 71.

It will be noted that the disk 71 is located at an elevation about in the midst of the spray zone. Thus some spray droplets can wash the gas while it is being distributed in the space 70. The elevation of the disk 71 with respect to the spray zone can be varied. Furthermore, the lower end of the baffle 75 can be projected downwardly through the disk opening 73 to provide an even longer channel 77 for the gas to flow in close proximity to the generator in the most intense spray. (See for example FIGURE 2, wherein numbers with prime symbols indicate elements corresponding, but modified, to elements of FIGURE 1.)

Figure 2:
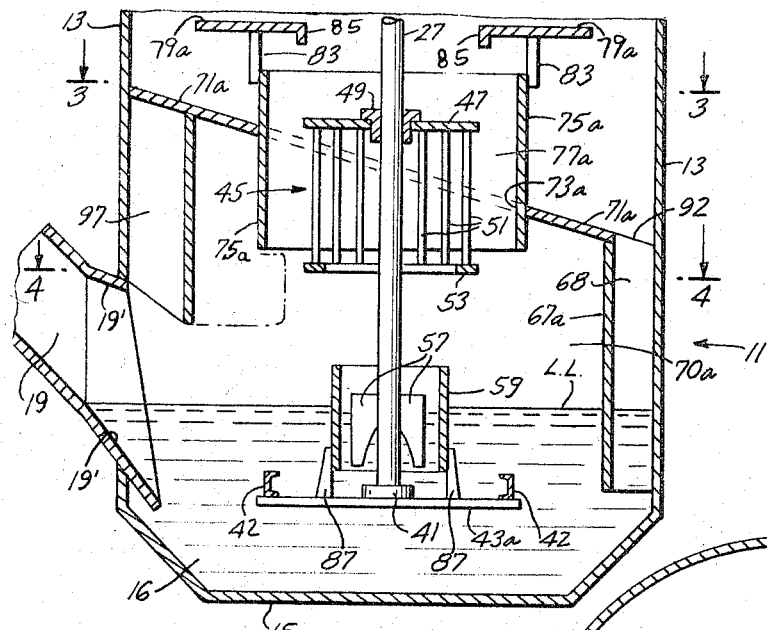
FIGURE 2 is an axial section and shows the lower portion of a washer similar to that in FIGURE 1 but having various modifications as compared to FIGURE 1.

Spaced within the housing 13 between the top of the vertical baffle 75 and eliminators 63 is a "satellite" baffle 79 which is a conical ring. The satellite baffle 79 is supported in the housing by arms 81, but can be supported instead (as shown in FIGURE 2) by posts 83 extending upwardly from the baffle 75 or similar posts projecting downwardly from the frame members 39. As shown in FIGURES 1 and 2, the satellite baffle can be a planar ring or a frusto-conical shaped annulus. It may also have a vertical strip 85, preferably at its inner periphery. The use of a satellite baffle 79 has been found to perform several functions. In addition to serving as another baffle for the elimination of gas-entrained droplets, such baffles also serve as an impingement and deposition surface for liquid droplets ricochetting from the housing and the vertical baffle 75. Since the vertical baffle 75 is very close to the spray generator and the droplets striking that baffle have very high kinetic energies, the droplets have a tendency to be splashed and spattered, and a portion is thrown into the eliminators 63 whose effectiveness might thereby be seriously impaired. The satellite baffle serves to block and accumulate such ricochetting droplets. That baffle also serves a diversionary function. That is, it tends to distribute the rather restricted flow of gas leaving the channel 77 prior to the entry of the gas into the eliminator region. Thus, the removal operation by the eliminators is facilitated by having the gas uniformly distributed throughout the eliminators to take advantage of their total surface area.

Liquid deposited on the interior surface of the vertical baffle 75 drains down and falls through the space 70 to the reservoir 16. Liquid accumulated elsewhere in the washer, e.g., on the eliminators, will drain down the housing 13 wall or fall onto the disk 71 from which it will drain down. In either latter case, it will pass through the passage 68 between the housing 13 and the inner shell 67.

The washer shown in FIGURE 2 is generally similar to the one shown in FIGURE 1, but has certain modifications and is another embodiment of the invention. The spray eliminator and blower devices, i.e., the upper portion of the washer, not shown in FIGURE 2, may be the same in FIGURE 1 or of other design and construction as may be preferred by the user. Corresponding parts are correspondingly numbered in FIGURE 2.

The housing 13 shown in FIGURE 2 has a shaft 27 axially positioned therein carrying a spray generator 45. The shaft is journaled in a bearing 41 supported by channel frames 42 extending from the housing. The pump means has impeller blades 57 attached to the shaft 27 and a collar 59 held by posts 87 from the channel frame 43a. An inlet duct 19 for incoming gas is at one side of the housing 13.

In place of the inner shell 67 and the disk 71 of the device in FIGURE 1, the embodiment of FIGURE 2 has a triangular shell 67a, baffle 97 and a sloping plate 71a with a central opening 73a. The plate 71a is secured to the housing 13 at its periphery, except as will be noted. The space 70a between the plate 71a and the liquid level LL. is even larger than the corresponding space 70 in FIGURE 1. The distribution of entering gas is enhanced by the larger space 70a.

Figure 3:
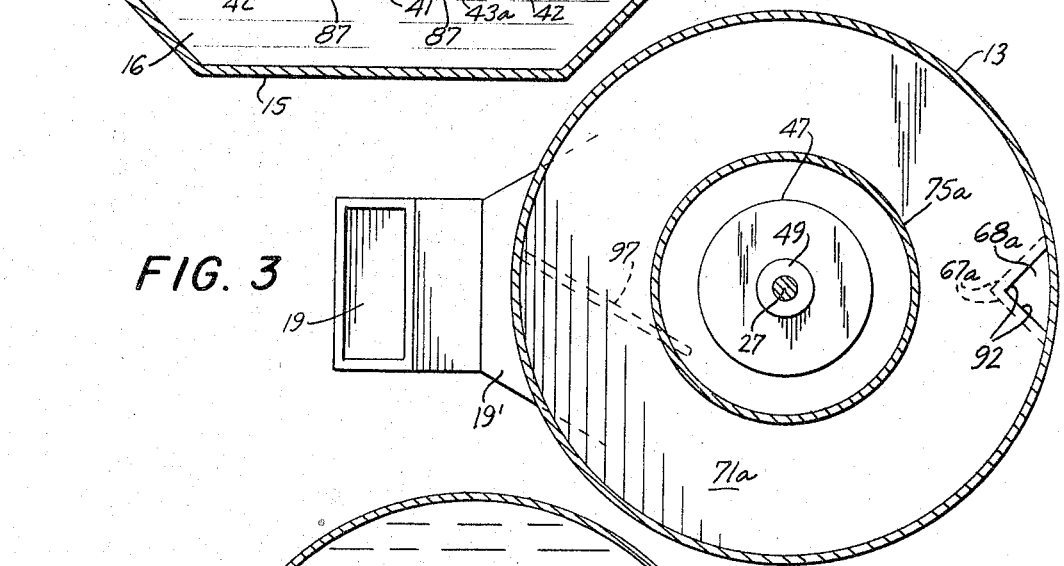
FIGURE 3 is a horizontal section taken along the line 3—3 of FIGURE 2.
Figure 4:
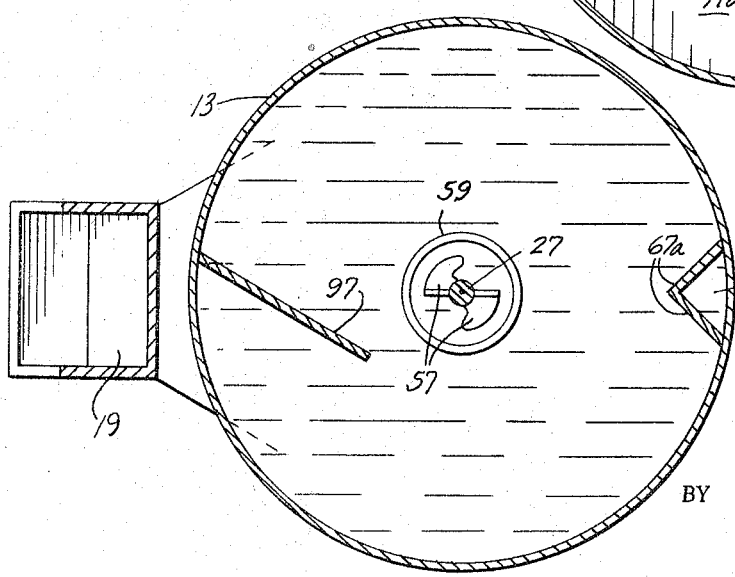
FIGURE 4 is a horizontal section taken along the line 4—4 of FIGURE 2.

At one side, at its lowest point, the plate 71a is cut-away, as shown in FIGURE 3 at 92. Extending downwardly from the plate 71a at the cut-away the triangular shell 67a forms a protected drain or conductor conduit 68a, as shown especially in FIGURE 4, which extends downwardly below the level of the liquid LL. in the reservoir 16, to form a liquid seal. Thus, liquid droplets from the spray zone falling onto the upper surface of the plate 71a run toward the cut-away 92 and return to the reservoir through the drain passage 68a.

A vertical baffle 75a, as mentioned previously, is located within the inner periphery of the opening 73a in the plate 71a. That baffle forms a channel 77a and serves to confine the upwardly flowing gas to be washed to the region of the spray zone adjacent the generator 45. Above and spaced from the baffle 75a by posts 83 is a satellite baffle 79a.

To aid in distributing the incoming gas within the space 70a below the plate 71a prior to the entry of the gas into the spray zone in the channel 77a is a vertical baffle or "splitter" 97. The splitter extends from the housing 13 to the vertical baffle 75a between the plate 71a and the top of the inlet 19. While the splitter 97 can be along a radius of the washer 11, it is preferred to place it at an angle thereto, e.g., along a chord of the housing 13. That arrangement can be seen in FIGURES 3 and 4. The splitter 97 tends to impart a tangential or rotary flow to the gas to aid its distribution within the space 70a.

The end of the splitter at the wall can be in line with the axis of the inlet 19 or slightly off-center as shown. It should be understood that a splitter panel 97 can also be used with the embodiment depicted in FIGURE 1, i.e., with the inner shell 67 and the horizontal disk 71.

Referring to all the figures, it will be seen that the inlet 19 comprises a duct 19' having a rectangular cross-section, although a polygonal, elliptical or circular shape would be satisfactory. At the end of the duct 19' where it meets the housing 13 is a transition piece, i.e., the sides of the duct 19' flare outwardly to the housing 13. This favors uniform distribution of gas and provides gradual expansion in the transition.

The vertical angle at which the gas enters the washer, determined largely by the angle at which the duct 19 is set, can of course be varied. However, it has been found that a preferred angle of entry within the range of about 30° to about 50° below the horizontal is advantageous. At an angle within that range, the gas flow tends to sweep, and be deflected by, the liquid in the reservoir 16 without causing undesirable surging of the liquid such as would cause irregular liquid feed to the generator 45. Moreover, at such an angle the gas tends initially to be delivered to the lowest region of the distribution space 70, and to utilize the full space 70, for gas distribution. At angles too near vertical, gas impinges so directly on the liquid that excessive turbulence of liquid and gas is caused, and the gas is not deflected as smoothly in the entire lower region of the distribution space 70. At entry angles closer to the horizontal, greater surging of the liquid may result, and the gas tends to be concentrated at the side of the space 70 opposite the inlet 19.

These washers may conveniently be of a size adapted to handle several thousand to about 30,000 cubic feet of gas per minute. The washer sizes vary, accordingly, from about 4 to 10 feet in diameter and have heights in the order of about from equal to half-again the diameter.

The spray generators have diameters in the order roughly of about one-fourth the washer diameter and heights ranging from about equal to three times the generator diameter. Washing liquid is used at rates varying from about 100 to 500 gallons per minute.

Water or aqueous solutions are the most commonly used washing liquid for such washers, although many others can be used depending on the nature of the gas to be washed and the nature of the pollutants to be removed from the gas. A variety of additives, such as foam depressants, corrosion inhibitors and surface active agents, can be used in the liquid. Furthermore, additives capable of chemically reacting with certain types of contaminants, such as corrosive vapors, can also be included with the washing liquid.

Preferred embodiments of this invention and various modifications thereof have been shown and described in this specification; but it is to be understood that the methods, apparatus and assemblies set forth for illustration of the invention are particular manifestations of the inventive concepts disclosed herein and defined in the appended claims, and are chosen for the purposes of illustration so that others skilled in the art will fully understand it and be enabled to modify it and make substitutions, each as may be best adapted to the conditions and requirements of its particular use.

We claim:

1. In a gas washer of the character described and having a generally vertical housing with a gas inlet adjacent the bottom and a gas outlet adjacent the top thereof, means for flowing a gas to be washed upwardly through said housing, a reservoir for containing a liquid washing medium and disposed generally in the lower portion of said housing, pump means for raising said liquid washing medium from said reservoir to a spray zone in said housing generally above said gas inlet, rotating impeller means acting on said washing medium raised from said reservoir for producing a generally transverse and rotating spray pattern of rapidly moving droplets of said washing medium in said spray zone for washing said gas and entrainment of said droplets therewith as said gas flows upwardly through said washer, and means for separating said entrained washing medium droplets from said gas flow above said spray zone, the combination which comprises a generally horizontal transverse partition, extending across said housing in the vertical vicinity of said spray zone and having a central opening therein surrounding and spaced from said rotating impeller means, said partition being above said gas inlet and sealed with respect thereto so that all gas to be washed entering said inlet and flowing through said housing must flow through said central opening in said partition and thus centrally through said spray zone and said partition being generally below said means for separating said entrained droplets of washing medium from said gas flow whereby said separated droplets fall onto said partition in areas thereof other than said central opening, drainage means at the periphery of said partition and said washer forming a passage for returning said separated entrained droplets of washing medium to said reservoir below said partition at the periphery thereof and by a passage other than through said central opening, said peripheral means for returning said droplets being in sealed separation from any path of upward flow of said gases to be washed.

2. Apparatus as defined in claim 1 in which said partition is substantially horizontal and in which said drainage means for returning said separated droplets to said reservoir extends substantially all around the periphery of said partition and said housing.

3. Apparatus as recited in claim 1 in which said transverse partition is disposed at a substantial angle to the horizontal, and in which said drainage means for returning said separated droplets to said reservoir are defined by a drainage passage at the low point of said partition and with the lower end of said passage extending in gas sealing relation below the liquid level in said reservoir.

4. Apparatus as recited in claim 1 which also includes a vertical splitter panel adjacent said gas inlet for splitting and directing and distributing gas entering through said inlet for enhanced flow upwardly through said central opening in said partition and through said spray zone.

5. Apparatus as recited in claim 1 which also includes a vertical annular baffle at said central opening of said partition and spaced around said spray zone.

6. Apparatus as recited in claim 5 in which said vertical baffle extends above said horizontal partition.

7. Apparatus as recited in claim 5 in which said vertical baffle extends above and below said partition.

8. Apparatus as recited in claim 1 which also includes an annular baffle spaced above said transverse partition and surrounding said gas flow through said central opening of said partition for distributing gas and entrained droplets of washing medium upwardly in said housing over said means for separating said entrained droplets from said gas flow.

9. Apparatus as recited in claim 8 in which said annular baffle is planar.

10. Apparatus as recited in claim 8 in which said annular baffle is frustro-conical in cross section.

References Cited by the Examiner
UNITED STATES PATENTS

| | | | |
|---|---|---|---|
| 2,143,628 | 1/1939 | Lea | 55—220 X |
| 2,527,015 | 10/1950 | Lhota | 261—117 X |
| 2,599,202 | 6/1952 | Schimpke | 261—91 |
| 2,687,184 | 8/1954 | Hutchinson et al. | 55—229 X |
| 2,796,241 | 6/1957 | Lhota | 261—91 |
| 2,833,417 | 5/1958 | Umbricht et al. | 55—230 X |
| 3,128,320 | 4/1964 | Umbricht | 261—29 |

FRANK W. LUTTER, *Primary Examiner.*

ROBERT F. BURNETT, *Examiner.*

D. K. DENEBERG, D. TALBERT, *Assistant Examiners.*